United States Patent [19]

Kancnik et al.

[11] Patent Number: 4,537,389

[45] Date of Patent: Aug. 27, 1985

[54] MACHINE TOOL FIXTURE

[75] Inventors: Adolph V. Kancnik, Glenview; Kenneth A. Klancnik, Palatine, both of Ill.

[73] Assignee: Universal Automatic Corporation, Des Plaines, Ill.

[21] Appl. No.: 565,292

[22] Filed: Dec. 27, 1983

[51] Int. Cl.³ .................................... B23Q 3/08

[52] U.S. Cl. .............................. 269/34; 269/234; 269/238; 269/254 R

[58] Field of Search .............. 269/34, 238, 234, 254 R

[56] References Cited

U.S. PATENT DOCUMENTS

| | | | |
|---|---|---|---|
| 492,931 | 3/1893 | Baird | 269/34 |
| 2,424,090 | 7/1947 | Gordinier | 269/234 |
| 2,790,361 | 4/1957 | Swanson et al. | 269/234 |
| 2,850,926 | 9/1958 | Jobe | 269/34 |
| 3,170,322 | 2/1965 | Cavanaugh | 269/34 |
| 4,076,227 | 2/1978 | Rameson | 269/238 |

FOREIGN PATENT DOCUMENTS

| | | | |
|---|---|---|---|
| 158873 | 2/1983 | German Democratic Rep. | 269/34 |

*Primary Examiner*—Robert C. Watson

*Attorney, Agent, or Firm*—Kinzer, Plyer, Dorn & McEachran

[57] ABSTRACT

A fixture for holding and presenting a work piece to a tool. The fixture includes a pair of pivotally mounted arms each of which has a jaw for closing on and engaging the work piece. The arms are disposed between a pair of opposed plates. Rollers are mounted on the plates adjacent the opposite ends thereof. A tapered rod extends between the rollers with a narrow part thereof engaging the rollers when the jaws are in their open position. A spring biases the tapered rod to dispose a wider portion of the rod in the space between the rollers to cause the jaws to close. A fluid actuated piston is attached to the tapered rod and is movable by the fluid alternately to assist or oppose the bias of the spring in moving the tapered rod.

4 Claims, 3 Drawing Figures

MACHINE TOOL FIXTURE

BACKGROUND AND SUMMARY OF THE INVENTION

This invention is directed to a fixture for use with a machine tool for the purpose of holding or presenting a work piece to a tool.

An object of this invention is a work piece which can alternately hold thin walled and thick walled work pieces with proper holding pressure applied to each type.

Another object of this invention is a work fixture in which a low holding pressure is applied to thin walled work pieces by a spring pressure.

Another object of this invention is a work piece fixture in which high working pressure is applied to a work piece through a combination of spring pressure and fluid pressure.

Another object of this invention is a work piece fixture having jaws which are normally biased to a closed position by spring pressure yet will move to their fully open position when the closing spring pressure is overcome.

Another object is a work piece fixture in which the fully open position of the work piece jaws can be easily adjusted.

Another object of this invention is a work fixture having a fluid operating piston which can be easily removed to permit the piston rod to be connected to an auxiliary source of fluid pressure.

Other and further objects of the present invention will become apparent from the following description and claims and are illustrated in the accompanying drawings which, by way of illustration, show a preferred embodiment of the present invention and the principle thereof in what is now considered to be the best mode contemplated for applying that principle. Other embodiments of the invention containing the same or equivalent principles may be used and structural changes may be made as desired by those skilled in the art without departing from the teachings of the present invention.

DESCRIPTION OF THE PREFERRED EMBODIMENT

Figure 1:
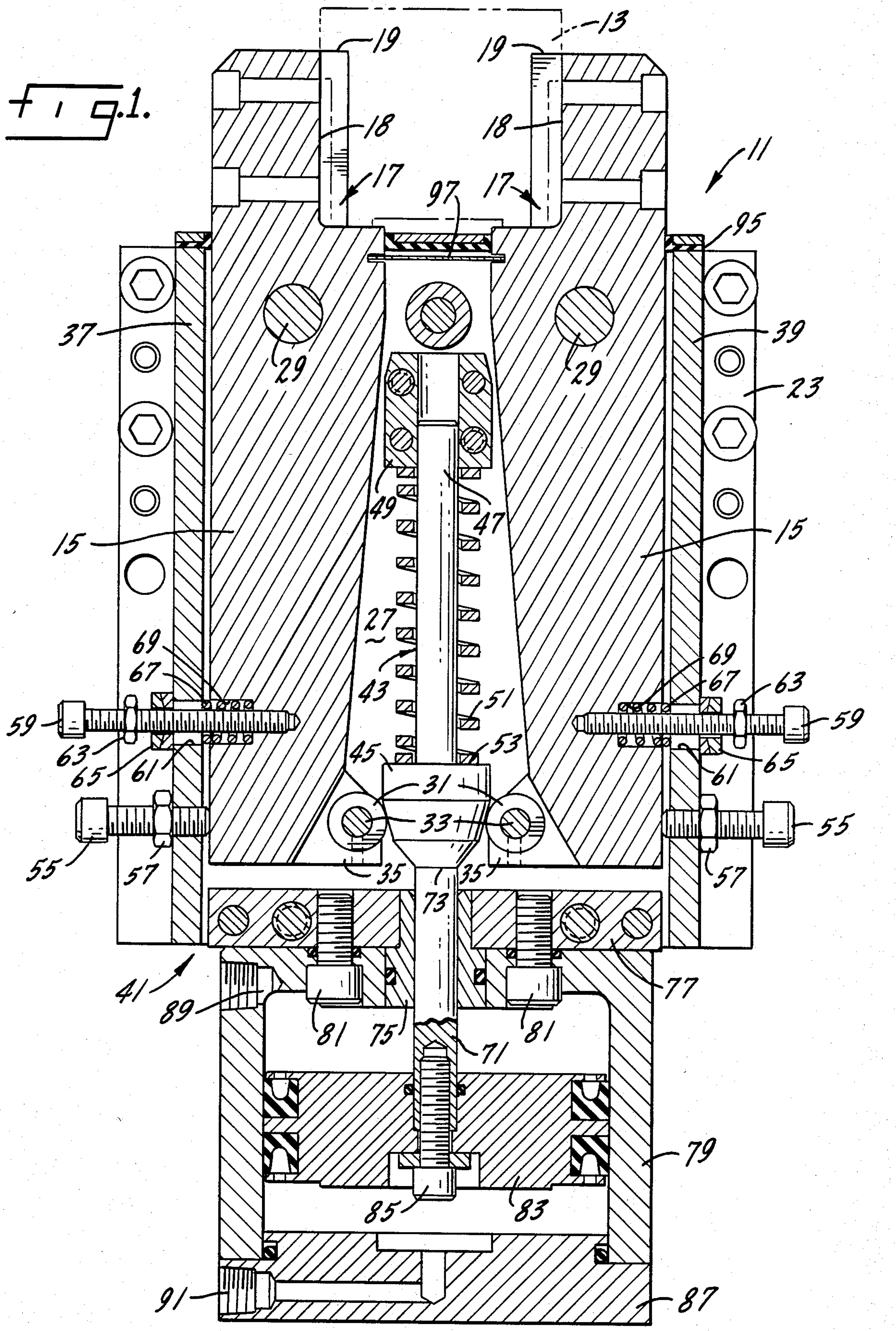
FIG. 1 is a cross sectional view taken through the work piece fixture of this invention with the work piece shown in phantom lines.
Figure 2:
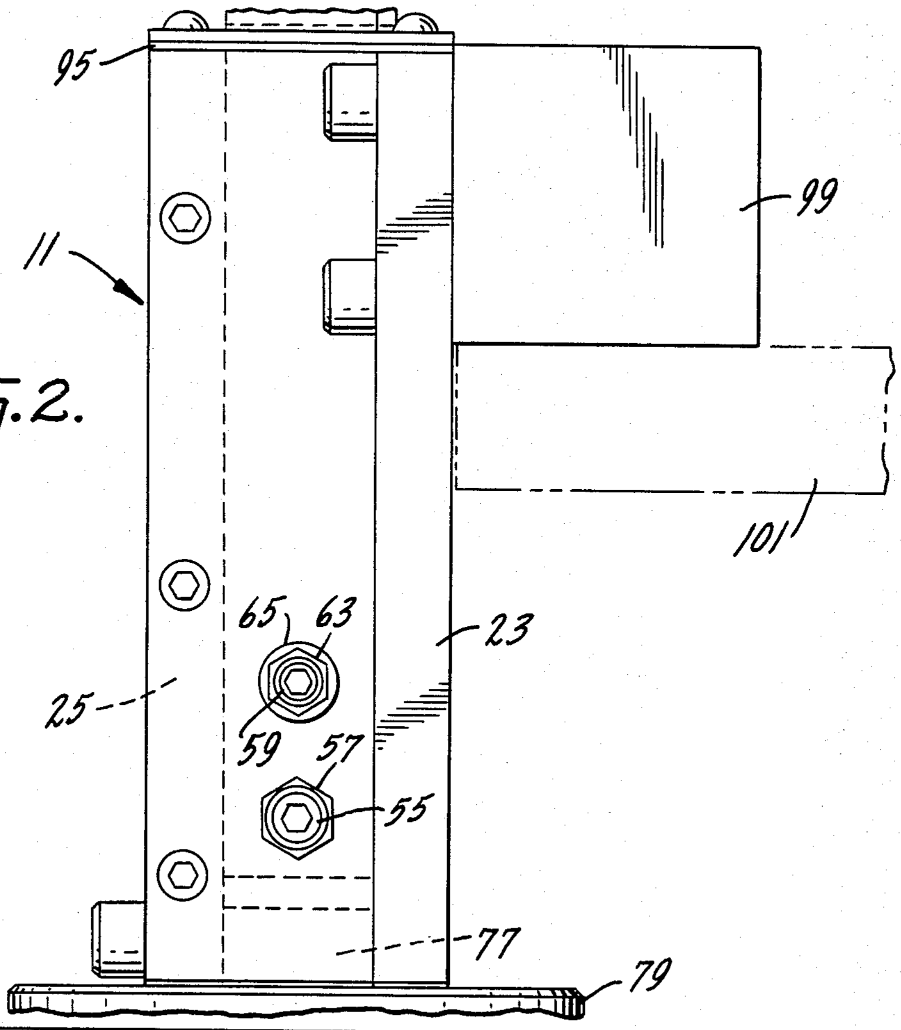
FIG. 2 is a side elevational view of the work piece fixture of FIG. 1 with some parts broken away and with the machine tool indexing mechanism on which the work piece fixture is mounted shown in phantom lines.
Figure 3:
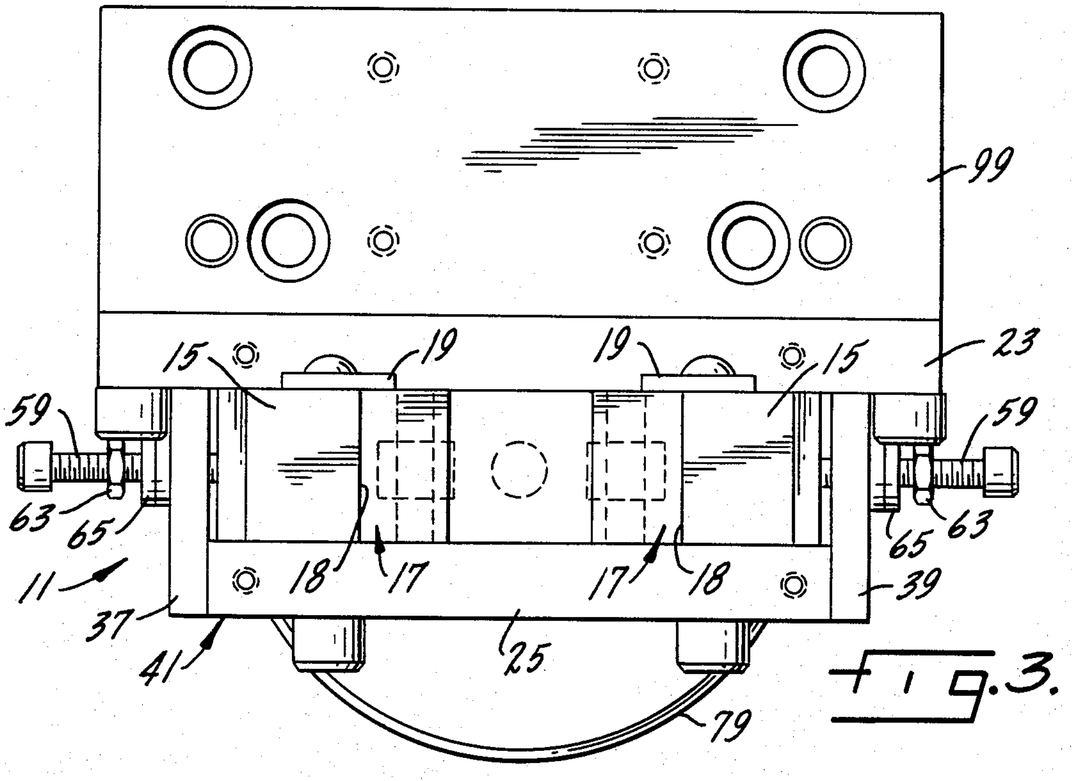
FIG. 3 is a top plan view of the work piece fixture of FIG. 1 with the top seal omitted for clarity of illustration.

The fixture 11 of the present invention is intended for presenting a work piece 13 to a tool. The fixture includes a pair of pivotally mounted arms 15 each of which at one end terminates in an L-shaped recess 17 defining a jaw 18. Adjacent each jaw is secured a work piece stop element 19. Each jaw 18 opposes the other and collectively they represent the contour of the work piece 13 to be disposed therebetween. The work pieces 13 may be automatically fed or hand fed to the open jaws whereafter the arms 15 are pivoted so as to contract the jaws to grip the work piece. The working tool (not shown) is then advanced to engage the work piece 13 to drill, tap, countersink or otherwise shape the work piece as desired.

The pivotally mounted arms 15 are disposed between outer support plates 23 and 25 with the arms and support plates forming a chamber 27 therebetween. The arms 15 are mounted on pivot pins 29 which extend between and are seated in the outer support plates 23 and 25. The arms 15 are equipped with rollers 31 that are located at the ends of the arms opposite to the ends having the jaws 18. These rollers are mounted on pins 33 which are located within bifurcated portions 35 located at the ends of the arms and formed integrally with the arms. The outer support plates 23 and 25 are held together by side plates 37 and 39 which together form a hollow rectangular box-like structure or housing 41.

A piston rod 43 is located in the chamber 27. The piston rod has an integral frusto-conical portion 45 which extends between and engages the rollers 31 mounted on the bifurcated ends of the pivotally mounted arms 15. The upper end 47 of the piston rod as viewed in FIG. 1 of the drawings slides in a guide bushing 49 which is mounted on the outer support plate 23. A coiled spring 51 fits around the rod 43 with one end of the spring bearing against the guide bushing 49 and the other end bearing against the flat base 53 of the frusto-conical portion 43 of the piston rod.

Engagement of the frusto-conical portion 45 of the piston rod 43 with the rollers 31 on the pivotally mounted arms 15 forces the jaws 18 of the arms towards each other. Movement of the jaws towards each other is limited by stop screws 55 which extend through the side plates 37 and 39, respectively. Jam nuts 57 are provided to hold the stop screws in their selected positions.

To limit opening movement of the jaws 18, adjustment screws 59 are attached to the pivotal arms 15 and extend through slots 61 in the side plates 37 and 39. Jam nuts 63 are threaded on the adjustment screws 59 and these jam nuts engage self-aligning washers 65 to limit opening movement of the jaws 18. The washers 65 slip over the adjustment screws and engage the side plates 37 and 39. Coil springs 67 are seated in counterbores 69 in the arms encircling the adjustment screws and the springs engage the side plates 37 and 39 to bias the jaws 18 of the arms to their open position. However, since the forces exerted by the coil springs 67 are much less than the force exerted by the spring 51 encircling the piston rod 43, the jaws 18 will not move to their open position as defined by the positions of the jam nuts 63 until the pressure of the spring 51 is overcome.

A narrow portion 71 of the piston rod 43 extends from the apex 73 of the frusto-conical portion 45 of the piston rod through a guide bushing 75 which is mounted on an end plate 77 attached to the housing 41. An air cylinder 79 is attached to the end plate 77 by bolts 81. The narrow portion 71 of the piston rod extends into a piston 83 mounted in the cylinder 79 and is attached thereto by a bolt 85 which is accessible after removal of the head 87 from the piston. The piston 83 is double acting. Air entering through port 89 can move the piston 83 to assist and increase the force applied by the spring 51 to close the jaws 18 or air pressure entered through port 91 can act against the spring 51 to allow the jaws 18 to move to their open position.

The manner of attachment of the cylinder 79 to the narrow portion 71 of the piston rod 43 permits the use of an auxiliary source of fluid power with this fixture when room is not available for installation of the cylinder 79 against the end plate 77. Thus, the narrow portion 71 of the piston rod could be extended through an opening in a table or other support and connected to any available fluid cylinder to provide a source of power for the piston rod 43. The cylinder can be removed simply by removal of the head 87, thus exposing the bolt 85 which permits removal of the piston 83. Removal of the piston exposes the bolts 81 which permit removal of the cylinder from the end plate 77.

A flexible, rectangular seal 95 is provided to enclose the pivotally mounted arms 15 and walls 23, 25, 37 and 39 which form the hollow, box-like housing 41. A spring-like protector 97 extends between the arms 15 to act as a chip shield for the chamber 27. A mounting block 99 is attached to the outer support plate 23. The mounting block 99 permits attachment of the fixture 11 to a fixture indexing device such as a dial plate 101.

We claim:

1. A fixture for holding and presenting a work piece to a tool and including:

a pair of pivotally mounted elongated arms, said arms at one end each having a jaw for closing on and engaging the work piece, said arms being disposed between a pair of opposed plates, rollers mounted on the arms adjacent the opposite ends thereof, a tapered rod extending between the rollers with the narrow part thereof engaging the rollers when the jaws are in their open position, spring means biasing the tapered rod to dispose the wider portion of the rod in the space between the rollers to cause the jaws to close, and a fluid actuated piston attached to the tapered rod and movable by the fluid alternately to assist or oppose the bias of the spring.

2. The fixture of claim 1 in which the tapered rod extends in a direction parallel to the elongated arms and is located between the elongated arms.

3. The fixture of claim 2 in which a narrow portion of the tapered rod extends beyond the ends of the elongated arms opposite to the jaw ends and attaches to the fluid actuated piston outwardly of the elongated arms.

4. The fixture of claim 1 further including adjustable opening and closing stop means which engage the elongated arms.

* * * * *